(12) United States Patent
Huang

(10) Patent No.: US 12,225,217 B2
(45) Date of Patent: Feb. 11, 2025

(54) VIDEO DATA PROCESSING METHOD AND APPARATUS, AND ELECTRONIC DEVICE

(71) Applicant: VIVO MOBILE COMMUNICATION CO., LTD., Guangdong (CN)

(72) Inventor: Jiangmin Huang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 114 days.

(21) Appl. No.: 17/983,562

(22) Filed: Nov. 9, 2022

(65) Prior Publication Data

US 2023/0066899 A1    Mar. 2, 2023

Related U.S. Application Data

(63) Continuation of application No. PCT/CN2021/095884, filed on May 25, 2021.

(30) Foreign Application Priority Data

May 26, 2020    (CN) .......................... 202010457827.0

(51) Int. Cl.
*H04N 19/166*    (2014.01)
*H04N 19/169*    (2014.01)
*H04N 19/61*    (2014.01)

(52) U.S. Cl.
CPC ......... *H04N 19/188* (2014.11); *H04N 19/166* (2014.11); *H04N 19/61* (2014.11)

(58) Field of Classification Search
CPC .... H04N 19/166; H04N 19/188; H04N 19/44; H04N 19/61; H04N 21/41407; H04N 21/4402; H04N 21/44209; H04N 21/6437
(Continued)

(56) References Cited

U.S. PATENT DOCUMENTS

2008/0291842 A1*  11/2008  Isambart .............. H04N 17/004
                                                       370/252
2009/0046580 A1    2/2009  Botzko et al.
(Continued)

FOREIGN PATENT DOCUMENTS

CN        101155311 A  *  4/2008  ............... H04N 7/64
CN        104703053 A     6/2015
(Continued)

OTHER PUBLICATIONS

Shinji Maeda, Shin Miura, "A Method of Decoder Control in Packet Loss Environment for IPTV Services", 4D-3, Information Processing Society of Japan 76th National Convention, Information Technology R&D Center, Mitsubishi Electric Corporation, 2014.

*Primary Examiner* — Behrooz M Senfi
(74) *Attorney, Agent, or Firm* — Price Heneveld LLP

(57) ABSTRACT

This application discloses a video data processing method and apparatus, and an electronic device. The method includes: receiving, by an electronic device, a first data packet, where the first data packet constitutes a target video frame; and in a case that the target video frame is a damaged frame, determining, by the electronic device based on a packet loss rate of second data packets, whether to decode the first data packet, where the second data packets are data packets received by the electronic device within a predetermined time period before the first data packet is received.

14 Claims, 3 Drawing Sheets

(58) Field of Classification Search
USPC .................................................. 375/240.02
See application file for complete search history.

(56) References Cited

U.S. PATENT DOCUMENTS

| | | |
|---|---|---|
| 2009/0138784 A1 | 5/2009 | Tamura et al. |
| 2012/0206610 A1* | 8/2012 | Wang .................. H04N 17/004 |
| | | 348/184 |
| 2013/0057639 A1* | 3/2013 | Ralston ............. H04N 21/2405 |
| | | 348/14.02 |
| 2015/0003530 A1 | 1/2015 | Gao et al. |

FOREIGN PATENT DOCUMENTS

| | | | | |
|---|---|---|---|---|
| CN | 105916059 A | | 8/2016 | |
| CN | 106303693 A | | 1/2017 | |
| CN | 108184166 A | | 6/2018 | |
| CN | 108881775 A | | 11/2018 | |
| CN | 109246486 A | * | 1/2019 | ....... H04N 21/64792 |
| CN | 109743628 A | | 5/2019 | |
| CN | 110996035 A | | 4/2020 | |
| CN | 111128203 A | | 5/2020 | |
| CN | 111601178 A | | 8/2020 | |
| JP | 2007208384 A | | 8/2007 | |
| JP | 2009027720 A | | 2/2009 | |
| JP | 2009212842 A | | 9/2009 | |
| JP | 2015524188 A | | 8/2015 | |
| WO | WO-2011054254 A1 | * | 5/2011 | ........... H04N 17/004 |
| WO | 2014194616 A1 | | 11/2014 | |

\* cited by examiner

VIDEO DATA PROCESSING METHOD AND APPARATUS, AND ELECTRONIC DEVICE

CROSS-REFERENCE TO RELATED APPLICATIONS

This application is a continuation application of International Application No. PCT/CN2021/095884 filed on May 25, 2021, which claims priority to Chinese Patent Application No. 202010457827.0, filed in China on May 26, 2020, which are incorporated herein by reference in their entireties.

TECHNICAL FIELD

This application pertains to the field of communications technologies, and specifically, relates to a video data processing method and apparatus, and an electronic device.

BACKGROUND

With development of electronic device technologies, electronic devices (such as mobile phones and tablet computers) have more functions, and users can use the electronic devices for real-time video transmission (such as video calls and live videos). In a process of real-time video transmission between a sender's electronic device and a receiver's electronic device, the sender's electronic device sends video data packets to the receiver's electronic device. After the receiver's electronic device receives the video data packets, the receiver's electronic device decodes the video data packets, and displays a video screen on a display of the receiver's electronic device.

In the related art, in a scenario in which quality of a network environment is poor and bandwidth resources are insufficient, because a packet loss occurs in the video data packets received by the receiver's electronic device, after the receiver's electronic device receives the video data packets, the receiver's electronic device usually decodes the received video data packets forcibly in a forcible decoding mode.

Therefore, when the packet loss of the video data packets is severe, due to poor video data quality, large-area blurs occur on the video displayed on the display of the receiver's electronic device, and video viewing experience of a user is affected.

SUMMARY

According to a first aspect, an embodiment of this application provides a video data processing method. The method includes: receiving, by an electronic device, a first data packet, where the first data packet constitutes a target video frame; and in a case that the target video frame is a damaged frame, determining, by the electronic device based on a packet loss rate of second data packets, whether to decode the first data packet, where the second data packets are data packets received by the electronic device within a predetermined time period before the first data packet is received.

According to a second aspect, an embodiment of this application provides a video data processing apparatus. The apparatus is applied to an electronic device and includes a receiving module and an execution module, where the receiving module is configured to receive a first data packet, where the first data packet constitutes a target video frame; and in a case that the target video frame received by the receiving module is a damaged frame, the execution module is configured to determine, based on a packet loss rate of second data packets, whether to decode the first data packet, where the second data packets are data packets received by the electronic device within a predetermined time period before the first data packet is received.

According to a third aspect, an embodiment of this application provides an electronic device. The electronic device includes a processor, a memory, and a program or an instruction stored in the memory and capable of running on the processor, where when the program or the instruction is executed by the processor, the steps of the method according to the first aspect are implemented.

According to a fourth aspect, an embodiment of this application provides a readable storage medium. The readable storage medium stores a program or an instruction, and when the program or the instruction is executed by a processor, the steps of the method according to the first aspect are implemented.

According to a fifth aspect, an embodiment of this application provides a chip. The chip includes a processor and a communications interface, the communications interface is coupled to the processor, and the processor is configured to run a program or an instruction to implement the method according to the first aspect.

DESCRIPTION OF EMBODIMENTS

Figure 1:
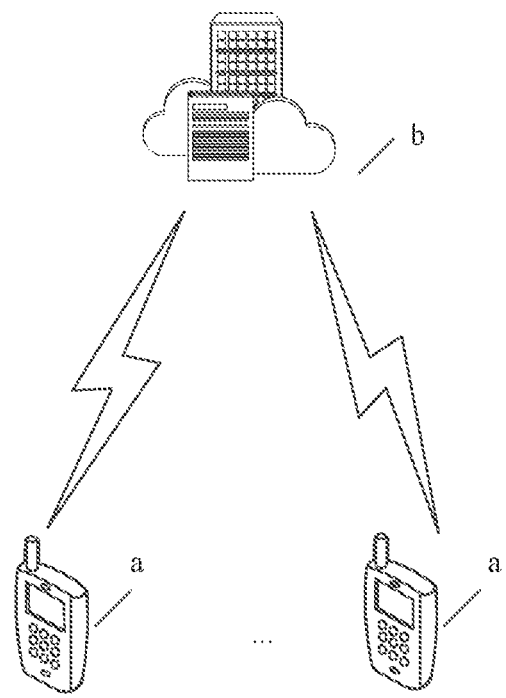
FIG. 1 is a possible schematic structural diagram of a communications system according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the numbers used in this way are interchangeable in appropriate circumstances, so that the embodiments of this application can be implemented in other orders than the order illustrated or described herein. In addition, the term "and/or" in the specification and claims indicates at least one of connected objects, and the character "/" generally represents an "or" relationship between associated objects.

The following describes the terms used in the embodiments of this application.

1. Packet Loss Rate

The packet loss rate is a ratio of lost data packets to send data packets in a data transmission process.

It should be noted that a packet loss is a loss of an entire data packet, rather than a loss of partial data of a data packet.

Before sending first data packets in a target video frame, a sender's electronic device may number the data packets in advance, so that a receiver's electronic device can conveniently detect whether there is a packet loss. For example, when the sender's electronic device sends a frame of data including 10 data packets to the receiver's electronic device, the sender's electronic device numbers the 10 data packets sequentially before sending the frame of data, where the numbers are 1 to 10. When receiving the frame of data, the receiver's electronic device detects that the frame of data includes only four data packets numbered 1, 4, 5, and 10. In this case, the electronic device can determine, based on the numbers, that there is a packet loss in this frame of data, and the packet loss rate is (10−4)/10×100%=60%.

2. Data Packet and Video Frame

A video includes several still pictures. The electronic device plays the several still pictures quickly and continuously within a unit time (for example, a frame rate of playing the video per second is 24 frames per second), and finally a video picture is formed.

In the foregoing video transmission process, due to a large amount of video data in the video, the electronic device usually presets a unified communication protocol (for example, the TCP/IP protocol), and both the receiver's electronic device and the sender's electronic device perform data transmission based on the communication protocol. Specifically, the sender's electronic device divides the video data to be transmitted into several data packets according to the communication protocol, and then encapsulates the several data packets in groups, where each group of data packets is encapsulated into a video frame, and each video frame includes X data packets for transmission. In a decoding process, the electronic device decodes the data packets in sequence based on a transmission sequence of video frames, and finally plays the video in the receiver's electronic device based on a predetermined frame rate.

A video data processing method provided in the embodiments of this application is hereinafter described in detail by using specific embodiments and application scenarios thereof with reference to the accompanying drawings.

FIG. 1 is a schematic diagram of a communications system used in a video data processing solution provided in an embodiment of this application. The communications system includes at least two (only two are shown in the figure) electronic devices a and a server b.

During a real-time video call between the at least two electronic devices, a sender's electronic device encapsulates real-time video data to obtain a video data packet, and then sends the video data packet to a receiver's electronic device. After receiving the video data packet, the receiver's electronic device decodes the video data packet, and therefore displays a video screen on a display of the receiver's electronic device.

It should be noted that a video data processing method provided in this embodiment of this application is applicable to the receiver's electronic device.

The video data processing method provided in this embodiment of this application may be applicable to a video call scenario or a live broadcast scenario. The following uses a video call scenario as an example for description.

In the related art, during a video call, if a network environment is poor, a packet loss occurs in video data packets received by an electronic device, and the electronic device usually performs processing according to a predetermined processing policy.

The predetermined processing policies generally include the following two policies.

First processing policy: It is a forcible decoding mode, that is, when the electronic device detects that there is a packet loss in received video data packets, the electronic device decodes and plays the received video data packets forcibly. Therefore, when the packet loss of the video data packets received by the electronic device is severe, large-area blurs occur on the display of the electronic device, and a call effect and user experience of a user are affected severely.

Second processing policy: It is a non-decoding mode, that is, when the electronic device detects that there is a packet loss in received video data packets, the electronic device discards the received video data packets, and does not decode the video data packets. In this case, frame freezing occurs on a picture on the display of the electronic device. Therefore, when the packet loss of the video data packets received by the electronic device is severe, frame freezing frequently occurs on the electronic device, resulting in severe degradation of call quality and experience of the user.

In this embodiment of this application, after receiving a first data packet, the electronic device determines whether a target video frame of the first data packet is a damaged frame. When the target data packet is a damaged frame, the electronic device selects, based on a packet loss rate of second data packets, a processing mode matching a network environment in which the electronic device is located, to process the first data packet, that is, decodes the first data packet or does not decode the first data packet. Therefore, a video finally played on the display of the electronic device can not only ensure that the electronic device can still perform a normal video call when the packet loss of the received first data packet is slight, but also avoid uncomfortable user experience caused by a poor display effect when the packet loss of the first data packet is severe. For example, when a lot of data packets are lost, the damaged frame is not decoded, so that no large-area blurs occur on the display of the electronic device. Conversely, when few data packets are lost, the damaged frame is decoded and played, so that only small-area blurs occur on the display of the electronic device.

Figure 2:
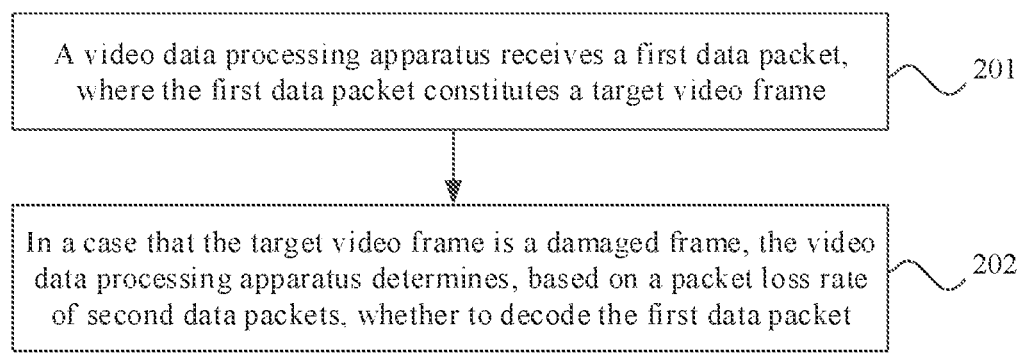
FIG. 2 is a first schematic flowchart of a video data processing method according to an embodiment of this application.

As shown in FIG. 2, an embodiment of this application provides a video data processing method. The method includes step 201 and step 202.

Step 201: A video data processing apparatus receives a first data packet, where the first data packet constitutes a target video frame.

In this embodiment of this application, the first data packet may include a plurality of data packets.

In this embodiment of this application, the target video frame may be one video frame, or may be a plurality of video frames. This is not limited in this embodiment of this application.

For example, when receiving first data packets, the video data processing apparatus may determine, by detecting whether trailing data packets of the first data packets are received, whether the first data packets have been all received.

Step 202: In a case that the target video frame is a damaged frame, the video data processing apparatus determines, based on a packet loss rate of second data packets, whether to decode the first data packet.

In this embodiment of this application, the damaged frame is a target video frame with a packet loss.

In this embodiment of this application, before calculating the packet loss rate of the second data packets, the video data processing apparatus first needs to determine whether the target video frame is a damaged frame. If the target video frame is not a damaged frame, that is, if the video data processing apparatus has received all the data packets in the target data packet, the video data processing apparatus can directly decode the target video frame without performing the subsequent step of calculating the packet loss rate of the second data packets to further determine a processing policy.

Optionally, in this embodiment of this application, the packet loss rate is a ratio of a quantity of lost packets to a first quantity. The quantity of lost packets is a difference between a second quantity and the first quantity, the first quantity is a quantity of data packets of a first video frame corresponding to the second data packets sent by a sender's electronic device, and the second quantity is a data packet quantity of the second data packets.

Optionally, in this embodiment of this application, the video data processing apparatus may execute different processing policies (for example, decoding or discarding) on the first data packet based on the packet loss rate of the second data packets. Specifically, in a case that the target video frame is a damaged frame, the video data processing apparatus obtains the packet loss rate of the second data packets, and may select, based on the packet loss rate of the second data packets, one of the first processing policy (that is, a forcible decoding mode) and the second processing policy (that is, a non-decoding mode) for execution.

In this embodiment of this application, the second data packets are data packets received by the video data processing apparatus within a predetermined time period before the first data packet is received.

Optionally, in this embodiment of this application, a lower limit of the predetermined time period may be predefined, or may be determined by the video data processing apparatus based on a historical network environment. This is not limited in this embodiment of this application.

For example, an interval between the lower limit of the predetermined time period and a time of receiving the trailing data packets of the first data packets may be a predetermined interval. The predetermined interval may be a predetermined time interval, or may be an interval of a predetermined quantity of data frames.

It should be noted that the predetermined interval may be predefined, or may be determined by an electronic device based on a historical situation of receiving data packets. Further, when the interval between the lower limit of the predetermined time period and the time of receiving the trailing data packets of the first data packets exceeds a predetermined maximum interval, the packet loss rate of the second data packets cannot correctly reflect quality of a current network environment, and further, a proper processing policy cannot be determined for the first data packets. Therefore, the predetermined interval is a value smaller than the predetermined maximum interval.

In an example, the second data packets may be first several data packets before the electronic device receives the first data packets, or the second data packets may be data packets of one or several video frames previous to the target video frame. In other words, when the predetermined interval is 0, the second data packets may be data packets adjacent to the first data packets.

In an example, data packets between a second data packet and a first data packet may constitute one or several data frames, and the data frame may be a complete data frame or a damaged frame. It may be understood that if fewer data frames are spaced between the second data packet and the first data packet, after the electronic device processes the first data packets according to the processing policy determined based on the packet loss rate of the second data packets, a play effect on a display is better.

In an example, the second data packets may include the first data packets, that is, the video frame corresponding to the second data packets includes the target video frame. For example, using a video with a frame rate of 24 frames per second as an example, if the predetermined time period is 2 seconds and the $x^{th}$ video frame is a damaged frame, when the electronic device determines a processing policy for data packets corresponding to the $x^{th}$ video frame, the electronic device determines, based on a packet loss rate of all data packets in the $x^{th}$ video frame and 48 video frames before the $x^{th}$ video frame, the processing policy for the data packets corresponding to the $x^{th}$ video frame.

Therefore, if an interval between the second data packets selected by the video data processing apparatus is shorter, a current network environment status can be better reflected, and accuracy of the finally determined processing policy is higher.

Optionally, in this embodiment of this application, duration of the predetermined time period may be predefined, or may be determined by the video data processing apparatus based on the historical network environment. This is not limited in this embodiment of this application.

In an example, before the video data processing apparatus performs real-time video transmission, the video data processing apparatus may set a plurality of time periods. Then, during the real-time video transmission, when detecting that a packet loss occurs in the first data packets, the video data processing apparatus may select one from the plurality of time periods as the predetermined time period, and then determine the second data packets based on the predetermined time period.

Further, each of the plurality of time periods corresponds to one transmission scenario, and an influencing factor corresponding to each scenario is different. The influencing factor includes at least one of the following: transmission network quality, a hardware parameter, an actual scenario environment, and the like.

Therefore, the video data processing apparatus can select a predetermined time period that is most suitable for the current transmission scenario, to finally determine the processing policy for the first data packets, so that the finally obtained processing policy is a processing policy with an optimal video play effect in the current transmission scenario.

Optionally, in this embodiment of this application, because a change speed of the real-time video transmission scenario in which the video data processing apparatus is located is lower than a video transmission speed, the video data processing apparatus may determine, based on a packet loss rate of a video frame close to the target video frame, a transmission environment of the real-time video transmission scenario in which the target video frame is located, thereby determining the processing policy for the first data packets corresponding to the target video frame. In other words, the predetermined time period may be considered as a balance time period required when the video data processing apparatus determines the processing policy for the first data packets.

For example, the predetermined time period may be related to factors that affect the target video frame in the transmission process. The influencing factors may include the transmission network quality, hardware parameter, actual scenario environment, and the like. The packet loss rate is an important parameter for the electronic device to determine a magnitude of impact of the influencing factors on the target video frame in the transmission process. The packet loss rate is directly proportional to the magnitude of the impact. To be specific, the higher the packet loss rate, the greater the impact; or the lower the packet loss rate, the smaller the impact.

For example, at three different network speeds, the video data processing apparatus continuously adjusts the time period used to determine the packet loss rate, and then the video data processing apparatus automatically records a blurs ratio of the target video frame on the display. In a period longer than a time period and shorter than a time period, when the blurs ratio is greater than a predetermined blurry area, it may be considered that the time period is a predetermined time period at the network speed.

Example 1: Assuming that a user uses a mobile phone to make a video call, during the video call, after receiving a data packet 1 (that is, the foregoing first data packet) of a video frame 1 (that is, the foregoing target video frame), a receiver's mobile phone determines that a packet loss occurs in the received video frame 1 and that the video frame is a damaged frame, because a network transmission speed is low and network quality is poor. In this case, based on a detection time of 3 seconds (that is, the foregoing predetermined time period) previously preset on the mobile phone, the receiver's mobile phone calculates a packet loss rate of data packets in the video frame 1 and in 3 seconds before the video frame 1 (the packet loss rate of the second data packets), and determines a processing policy for the data packet 1 based on the packet loss rate.

In the video data processing method provided in this embodiment of this application, after receiving the first data packet, the video data processing apparatus determines whether the target video frame of the first data packet is a damaged frame. When the target data packet is a damaged frame, the video data processing apparatus selects, based on the packet loss rate of the second data packets, a processing mode matching the network environment in which the video data processing apparatus is located, to process the first data packet, that is, decodes the first data packet or does not decode the first data packet. Therefore, the video finally played on the display of the video data processing apparatus can not only ensure that the video data processing apparatus can still perform a normal video call when the packet loss of the received first data packet is slight, but also avoid uncomfortable user experience caused by a poor display effect when the packet loss of the first data packet is severe. For example, when a lot of data packets are lost, the damaged frame is not decoded, so that no large-area blurs occur on the display of the electronic device. Conversely, when few data packets are lost, the damaged frame is decoded and played, so that only small-area blurs occur on the display of the electronic device.

Figure 3:
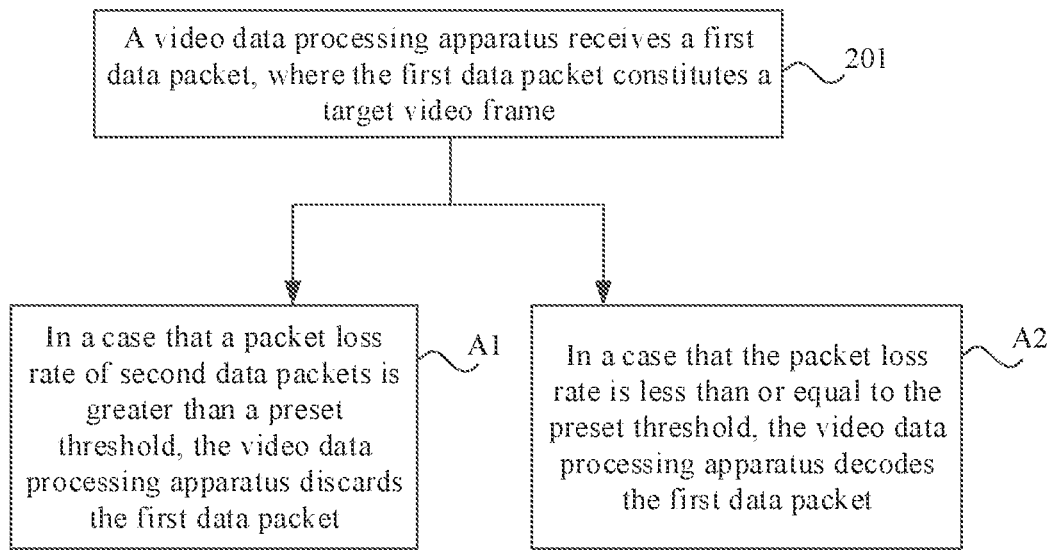
FIG. 3 is a second schematic flowchart of a video data processing method according to an embodiment of this application.

Optionally, in this embodiment of this application, as shown in FIG. 3, in the foregoing step 202, the video data processing method provided in this embodiment of this application may include the following step A1 or step A2.

Step A1: In a case that the packet loss rate of the second data packets is greater than a preset threshold, the video data processing apparatus discards the first data packet.

Step A2: In a case that the packet loss rate is less than or equal to the preset threshold, the video data processing apparatus decodes the first data packet.

For example, the preset threshold is a reference threshold obtained by the video data processing apparatus in advance based on different packet loss rates and final display conditions on the display. The preset threshold may be preset by the video data processing apparatus, or may be user-defined.

In an example, a plurality of packet loss rate thresholds are prestored in the video data processing apparatus, and each packet loss rate threshold corresponds to one blurs ratio. Therefore, after obtaining the packet loss rate of the second data packets, the video data processing apparatus selects, from the plurality of packet loss rate thresholds based on an acceptable blurs ratio when the user views the video, a packet loss rate threshold matching the acceptable blurs ratio when the user views the video, as the preset threshold.

For example, when the packet loss rate of the second data packets is greater than the preset threshold, it may be considered that a packet loss rate of the first data packets is excessively large. In this case, after the video data processing apparatus decodes the first data packet, a ratio of an area of blurs displayed on the display to an area of the entire display is excessively large, and the entire screen is in disorder. Consequently, the video viewing experience of the user is severely affected. Therefore, the video data processing apparatus does not decode the first data packet, that is, discards the first data packet.

Further, the discarding the first data packet means dropping the first data packet without decoding data in the first data packet any more.

Further, after the video data processing apparatus skips decoding the first data packet, a video decoded from a previous frame of the target video frame is continuously displayed on the display of the video data processing apparatus. In an actual application, frame freezing occurs on a picture displayed on the display.

For example, when the packet loss rate of the second data packets is less than or equal to the preset threshold, it may be considered that the packet loss rate of the first data packets is within a preset range. In this case, after the video data processing apparatus decodes the first data packets, although the first data packets have a packet loss, a ratio of an area of blurs finally displayed on the display to the area of the entire display is within a range acceptable to the user, most of the data in the first data packets can be received completely, and viewing experience of the user is not affected. Therefore, the video data processing apparatus decodes the first data packets.

Further, after the video data processing apparatus decodes the first data packets, a video decoded from the target video frame is displayed on the display of the video data processing apparatus. In an actual application, slight blurs occur on a picture displayed on the display.

Example 2: With reference to the foregoing example 1, when the packet loss rate of the data packets in the video frame 1 and the 3 seconds before the video frame 1 is less than the preset threshold, the mobile phone does not decode the video frame 1, and in this case, the display of the mobile phone displays a still picture generated from the video frame before the video frame 1; or when the packet loss rate of the data packets in the video frame 1 the 3 seconds before the video frame 1 is greater than the preset threshold, the mobile phone decodes the video frame 1, and in this case, the display displays a picture 1 after the video frame 1 is decoded, where slight blurs occur on the picture 1, but viewing of main content by the user is not affected.

Therefore, with reference to the current transmission environment, the video data processing apparatus can determine a video display mode that conforms to the user's viewing habit. When the packet loss rate is excessively high, the video data processing apparatus skips decoding the first data packets and displays a video screen as a picture with frame freezing, to keep the video screen clean and improve viewing comfort of the user. When the packet loss rate is low, the video data processing apparatus displays the first data packets, to maximally ensure that the user continuously views the real-time video screen without viewing comfort of the user affected.

Optionally, in this embodiment of this application, in the foregoing step 202, the video data processing method provided in this embodiment of this application may include the following step B1 and step B2, or step B1 and step B3.

Step B1: The video data processing apparatus determines a damage degree of the target video frame based on the packet loss rate of the second data packets.

Step B2: In a case that the damage degree satisfies a first condition, the video data processing apparatus decodes the first data packet.

Step B3: In a case that the damage degree satisfies a second condition, the video data processing apparatus discards the first data packet.

For example, the damage degree of the target video frame is a basis for the video data processing apparatus to determine whether to decode the first data packet.

For example, the damage degree of the target video frame is directly proportional to the packet loss rate of the second data packets, that is, the damage degree of the target video frame can be quantified based on the packet loss rate of the second data packets. If the packet loss rate of the second data packets is higher, the video data processing apparatus determines that the damage degree of the target video frame is severer. Conversely, if the packet loss rate of the second data packets is lower, the video data processing apparatus determines that the damage degree of the target video frame is slighter.

For example, the first condition includes that the damage degree of the target video frame is lower than or equal to a predetermined damage degree, and the second condition includes that the damage degree of the target video frame is higher than the predetermined damage degree.

Therefore, the video data processing apparatus can determine the damage degree of the first data packets based on the packet loss rate of the second data packets, and further determine the processing policy for the first data packets, so that the user can obtain an optimal viewing effect in real-time video transmission.

Optionally, in this embodiment of this application, the first data packet includes N data packets. On this basis, after the foregoing step 201, the video data processing method provided in this embodiment of this application may further include the following step C.

Step C: In a case that data packet numbers of target data packets in the N data packets are discontinuous, the electronic device determines that the target video frame is a damaged frame.

The target data packets are trailing data packets of the target video frame, and N is a positive integer.

For example, before determining the processing policy for the first data packets, the video data processing apparatus needs to first determine whether the target video frame has been received completely, and further determines, only after confirming completion of reception, that the target video frame is a damaged frame.

In an example, before sending video data, when encapsulating first data packets, the sender's electronic device has written different sequence numbers for all data in the first data packets, and marked trailing data packets and start data packets. The sequence numbers are continuous sequence numbers. Therefore, the video data processing apparatus can confirm, only by identifying the trailing data packets, that the target data frame has been received completely. In addition, the video data processing apparatus can easily detect, by determining whether the sequence numbers are continuous, whether a packet loss has occurred, that is, check whether the target data frame is a damaged frame.

It should be noted that trailing data packets in some target video frames may be lost. However, because a trailing data packet and a start data packet are encapsulated for each frame of data, even if the trailing data packet is lost, the electronic device can segment data packets in different video frames by identifying a start packet in a next frame. In a case that the electronic device loses both the trailing data packet and the start data packet, the electronic device processes the target video frame according to a processing policy used for the previous video frame, until the video data processing apparatus can distinguish and identify data of different video frames.

Optionally, in this embodiment of this application, in the real-time video transmission process, when a total transmission time of data packets transmitted before the target video frame is less than the preset time period, the video data processing apparatus decodes the target video frame by using a preset processing policy.

For example, when the predetermined time period is S, if the time period from a start time T0 of starting to transmit a video by the video data processing apparatus to a time T1 of a trailing data packet of a current video frame is less than or equal to S, the video data processing apparatus processes data packets received within the time period from T0 to T1 according to the preset processing policy. In other words, the video data processing apparatus may set the processing policy for the data packets received within the time period from T0 to T2 (duration from T0 to T2 is S) to the forcible decoding mode (that is, the foregoing first processing policy) or the non-decoding mode (that is, the foregoing second processing policy).

For example, the foregoing preset processing policy may be user-defined, or may be preset by the electronic device. This is not limited in this embodiment of this application.

It should be noted that, in the embodiments of this application, the message display methods shown in the drawings of the methods are all exemplarily described by using one of the drawings in the embodiments of this application as an example. In a specific implementation, the foregoing message display methods shown in the drawings of the methods may alternatively be implemented with reference to any other citable drawing illustrated in the foregoing embodiments, and details are not described herein again.

It should be noted that, in the embodiments of this application, the video data processing method provided in the embodiments of this application may be performed by the video data processing apparatus, or a control module for performing the video data loading processing method in the video data processing apparatus. In the embodiments of this application, the video data processing method provided in the embodiments of this application is described by using an example in which the video data processing apparatus performs the video data loading processing method.

Figure 4:
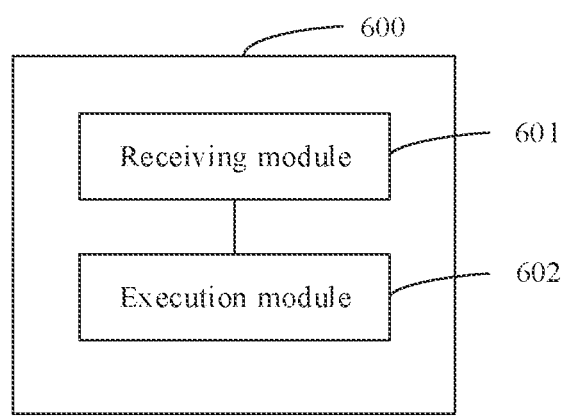
FIG. 4 is a schematic structural diagram of a video data processing apparatus according to an embodiment of this application.

FIG. 4 is a possible schematic structural diagram of a video data processing apparatus according to an embodiment of this application. As shown in FIG. 4, the video data processing apparatus 600 is applied to an electronic device and includes a receiving module 601 and an execution module 602. The receiving module 601 is configured to receive a first data packet, where the first data packet constitutes a target video frame; and in a case that the target video frame received by the receiving module 601 is a damaged frame, the execution module 602 is configured to determine, based on a packet loss rate of second data packets, whether to decode the first data packet, where the second data packets are data packets received by the electronic device within a predetermined time period before the first data packet is received.

Optionally, in this embodiment of this application, the execution module 602 is specifically configured to: in a case that the packet loss rate of the second data packets received by the receiving module 601 is greater than a preset threshold, discard the first data packet; or in a case that the packet loss rate received by the receiving module 601 is less than or equal to the preset threshold, decode the first data packet.

Optionally, in this embodiment of this application, the execution module 602 is specifically configured to: determine a damage degree of the target video frame based on the packet loss rate of the second data packets; and in a case that the damage degree satisfies a first condition, decode the first data packet; or in a case that the damage degree satisfies a second condition, discard the first data packet.

Optionally, in this embodiment of this application, the first data packet includes N data packets; and in a case that data packet numbers of target data packets in the N data packets are determined as discontinuous, the execution module 602 is further configured to determine that the target video frame is a damaged frame, where the target data packets are trailing data packets of the target video frame, and N is a positive integer.

Optionally, in this embodiment of this application, the packet loss rate is a ratio of a quantity of lost packets to a first quantity, the quantity of lost packets is a difference between a second quantity and the first quantity, the first quantity is a quantity of data packets of a first video frame corresponding to the second data packets sent by a sender's electronic device, and the second quantity is a data packet quantity of the second data packets.

The video data processing apparatus in this embodiment of this application may be a terminal, or may be a component, an integrated circuit, or a chip in a terminal. The apparatus may be a mobile electronic device, or may be a nonmobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The nonmobile electronic device may be a server, a network attacked storage (NAS), a personal computer (PC), a television (TV), a teller machine, a self-service machine, or the like. This is not specifically limited in this embodiment of this application.

The video data processing apparatus in this embodiment of this application may be an apparatus having an operating system. The operating system may be an Android operating system, an iOS operating system, or other possible operating systems, and is not specifically limited in this embodiment of this application.

The video data processing apparatus provided in this embodiment of this application can implement each process implemented by the video data processing apparatus in the method embodiments in FIG. 2 to FIG. 3. To avoid repetition, details are not described herein again.

After receiving the first data packet, the video data processing apparatus provided in this embodiment of this application determines whether the target video frame of the first data packet is a damaged frame. When the target data packet is a damaged frame, the video data processing apparatus selects, based on the packet loss rate of the second data packets, a processing mode matching a network environment in which the video data processing apparatus is located, to process the first data packet, that is, decodes the first data packet or does not decode the first data packet. Therefore, a video finally played on a display of the video data processing apparatus can not only ensure that the video data processing apparatus can still perform a normal video call when the packet loss of the received first data packet is slight, but also avoid uncomfortable user experience caused by a poor display effect when the packet loss of the first data packet is severe. For example, when a lot of data packets are lost, the damaged frame is not decoded, so that no large-area blurs occur on the display of the electronic device. Conversely, when few data packets are lost, the damaged frame is decoded and played, so that only small-area blurs occur on the display of the electronic device.

Optionally, an embodiment of this application further provides an electronic device, including a processor 1010, a memory 1009, and a program or an instruction stored in the memory 1009 and capable of running on the processor 1010. When the program or the instruction is executed by the processor 1010, the processes of the foregoing video data processing method embodiment are implemented, with the same technical effects achieved. To avoid repetition, details are not described herein again.

It should be noted that electronic devices in this embodiment of this application include the foregoing mobile electronic device and a nonmobile electronic device.

Figure 5:
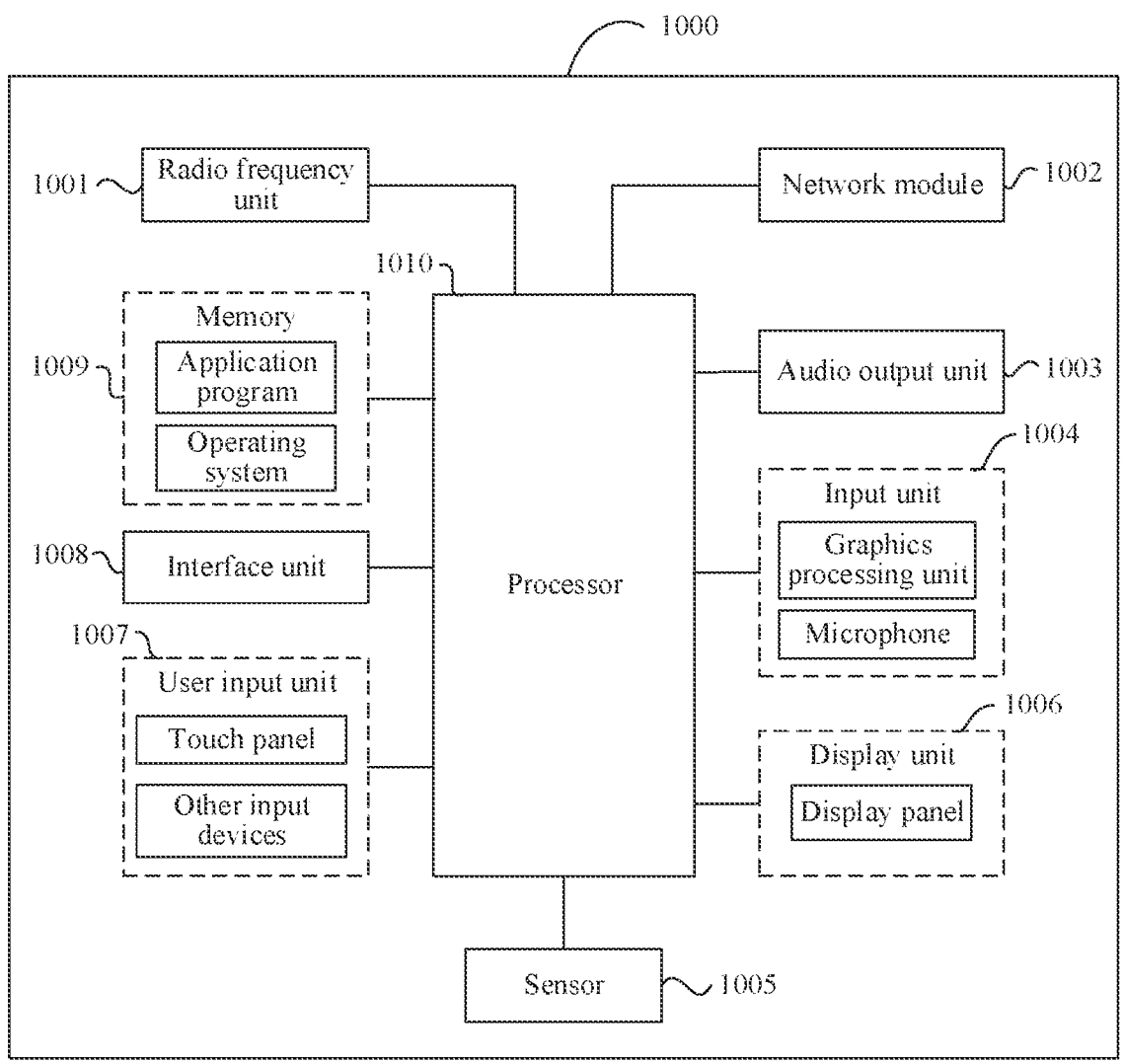
FIG. 5 is a schematic structural diagram of an electronic device according to an embodiment of this application.

FIG. 5 is a schematic diagram of a hardware structure of an electronic device for implementing an embodiment of this application.

The electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art may understand that the electronic device 1000 may further include a power supply (such as a battery) for supplying power to the components. The power supply may be logically connected to the processor 1010 through a power management system. In this way, functions such as charge management, discharge management, and power consumption management are implemented by using the power management system. The structure of the electronic device shown in FIG. 5 does not constitute a limitation on the electronic device. The electronic device may include more or fewer components than those shown in the figure, or some components are combined, or component arrangements are different. Details are not described herein again.

The radio frequency unit 1001 is configured to receive a first data packet, where the first data packet constitutes a target video frame; and in a case that the target video frame received by the radio frequency unit 1001 is a damaged frame, the processor 1010 is further configured to determine, based on a packet loss rate of second data packets, whether to decode the first data packet, where the second data packets are data packets received by the electronic device within a predetermined time period before the first data packet is received.

Optionally, the processor 1010 is specifically configured to: in a case that the packet loss rate of the second data packets received by the radio frequency unit 1001 is greater than a preset threshold, discard the first data packet; or in a case that the packet loss rate received by the processor 1010 is less than or equal to the preset threshold, decode the first data packet.

Optionally, the processor 1010 is specifically configured to: determine a damage degree of the target video frame based on the packet loss rate of the second data packets; and in a case that the damage degree determined by the processor 1010 satisfies a first condition, decode the first data packet; or in a case that the damage degree determined by the processor 1010 satisfies a second condition, discard the first data packet.

Optionally, the first data packet includes N data packets; and in a case that data packet numbers of target data packets in the N data packets are determined as discontinuous, the processor 1010 is further configured to determine that the target video frame is a damaged frame, where the target data packets are trailing data packets of the target video frame, and N is a positive integer.

Optionally, the packet loss rate is a ratio of a quantity of lost packets to a first quantity, the quantity of lost packets is a difference between a second quantity and the first quantity, the first quantity is a quantity of data packets of a first video frame corresponding to the second data packets sent by a sender's electronic device, and the second quantity is a data packet quantity of the second data packets.

After the electronic device provided in this embodiment of this application receives the first data packet, the electronic device determines whether the target video frame of the first data packet is a damaged frame. When the target data packet is a damaged frame, the electronic device selects, based on the packet loss rate of the second data packets, a processing mode matching a network environment in which the video data processing apparatus is located, to process the first data packet, that is, decodes the first data packet or does not decode the first data packet. Therefore, a video finally played on a display of the video data processing apparatus can not only ensure that the electronic device can still perform a normal video call when the packet loss of the received first data packet is slight, but also avoid uncomfortable user experience caused by a poor display effect when the packet loss of the first data packet is severe. For example, when a lot of data packets are lost, the damaged frame is not decoded, so that no large-area blurs occur on the display of the electronic device. Conversely, when few data packets are lost, the damaged frame is decoded and played, so that only small-area blurs occur on the display of the electronic device.

An embodiment of this application further provides a readable storage medium. The readable storage medium stores a program or an instruction. When the program or the instruction is executed by a processor, the processes of the foregoing video data processing method embodiment are implemented, with the same technical effects achieved. To avoid repetition, details are not described herein again.

The processor is the processor in the electronic device described in the foregoing embodiment. The readable storage medium includes a computer-readable storage medium, for example, a computer read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or an instruction to implement each process of the foregoing video data processing method embodiment, with the same technical effects achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings. However, this application is not limited to the foregoing specific embodiments. The foregoing specific embodiments are merely illustrative rather than restrictive. Inspired by this application, a person of ordinary skill in the art can still derive a plurality of variations without departing from the essence of this application and the protection scope of the claims. All these variations shall fall within the protection scope of this application.

What is claimed is:

1. A video data processing method, applied to an electronic device, wherein the method comprises:
   receiving a first data packet, wherein the first data packet constitutes a target video frame; and
   in a case that the target video frame is a damaged frame, determining, based on a packet loss rate of second data packets, whether to decode the first data packet, wherein
   the second data packets are data packets received by the electronic device within a predetermined time period before the first data packet is received;

wherein the packet loss rate is a ratio of a quantity of lost packets to a first quantity, the quantity of lost packets is a difference between a second quantity and the first quantity, the first quantity is a quantity of data packets of a first video frame corresponding to the second data packets sent by a sender's electronic device, and the second quantity is a data packet quantity of the second data packets.

2. The method according to claim 1, wherein the determining, based on a packet loss rate of second data packets, whether to decode the first data packet comprises:
in a case that the packet loss rate of the second data packets is greater than a preset threshold, discarding the first data packet; or
in a case that the packet loss rate of the second data packets is less than or equal to the preset threshold, decoding the first data packet.

3. The method according to claim 1, wherein the determining, based on a packet loss rate of second data packets, whether to decode the first data packet comprises:
determining a damage degree of the target video frame based on the packet loss rate of the second data packets; and
in a case that the damage degree satisfies a first condition, decoding the first data packet; or
in a case that the damage degree satisfies a second condition, discarding the first data packet.

4. The method according to claim 1, wherein the first data packet comprises N data packets; and
after the receiving a first data packet, the method further comprises:
in a case that data packet numbers of target data packets in the N data packets are determined as discontinuous, determining that the target video frame is a damaged frame, wherein
the target data packets are trailing data packets of the target video frame, and N is a positive integer.

5. An electronic device, comprising a processor, a memory, and a program or an instruction stored in the memory and capable of running on the processor, wherein when the program or the instruction is executed by the processor, the steps of a video data processing method are implemented, and the video data processing method comprises:
receiving a first data packet, wherein the first data packet constitutes a target video frame; and
in a case that the target video frame is a damaged frame, determining, based on a packet loss rate of second data packets, whether to decode the first data packet, wherein
the second data packets are data packets received by the electronic device within a predetermined time period before the first data packet is received;
wherein the packet loss rate is a ratio of a quantity of lost packets to a first quantity, the quantity of lost packets is a difference between a second quantity and the first quantity, the first quantity is a quantity of data packets of a first video frame corresponding to the second data packets sent by a sender's electronic device, and the second quantity is a data packet quantity of the second data packets.

6. The electronic device according to claim 5, wherein the determining, based on a packet loss rate of second data packets, whether to decode the first data packet comprises:
in a case that the packet loss rate of the second data packets is greater than a preset threshold, discarding the first data packet; or
in a case that the packet loss rate of the second data packets is less than or equal to the preset threshold, decoding the first data packet.

7. The electronic device according to claim 5, wherein the determining, based on a packet loss rate of second data packets, whether to decode the first data packet comprises:
determining a damage degree of the target video frame based on the packet loss rate of the second data packets; and
in a case that the damage degree satisfies a first condition, decoding the first data packet; or
in a case that the damage degree satisfies a second condition, discarding the first data packet.

8. The electronic device according to claim 5, wherein the first data packet comprises N data packets; and
after the receiving a first data packet, the method further comprises:
in a case that data packet numbers of target data packets in the N data packets are determined as discontinuous, determining that the target video frame is a damaged frame, wherein
the target data packets are trailing data packets of the target video frame, and N is a positive integer.

9. A non-transitory readable storage medium, wherein the non-transitory readable storage medium stores a program or an instruction, and when the program or the instruction is executed by a processor of an electronic device, the steps of a video data processing method are implemented, and the video data processing method comprises:
receiving a first data packet, wherein the first data packet constitutes a target video frame; and
in a case that the target video frame is a damaged frame, determining, based on a packet loss rate of second data packets, whether to decode the first data packet, wherein
the second data packets are data packets received by the electronic device within a predetermined time period before the first data packet is received;
wherein the packet loss rate is a ratio of a quantity of lost packets to a first quantity, the quantity of lost packets is a difference between a second quantity and the first quantity, the first quantity is a quantity of data packets of a first video frame corresponding to the second data packets sent by a sender's electronic device, and the second quantity is a data packet quantity of the second data packets.

10. An electronic device, wherein the electronic device is configured to perform the video data processing method according to claim 1.

11. A chip, wherein the chip comprises a processor and a communications interface, the communications interface is coupled to the processor, and the processor is configured to run a program or an instruction to implement the video data processing method according to claim 1.

12. The non-transitory readable storage medium according to claim 9, wherein the determining, based on a packet loss rate of second data packets, whether to decode the first data packet comprises:
in a case that the packet loss rate of the second data packets is greater than a preset threshold, discarding the first data packet; or
in a case that the packet loss rate of the second data packets is less than or equal to the preset threshold, decoding the first data packet.

13. The non-transitory readable storage medium according to claim 9, wherein the determining, based on a packet loss rate of second data packets, whether to decode the first data packet comprises:
- determining a damage degree of the target video frame based on the packet loss rate of the second data packets; and
- in a case that the damage degree satisfies a first condition, decoding the first data packet; or
- in a case that the damage degree satisfies a second condition, discarding the first data packet.

14. The non-transitory readable storage medium according to claim 9, wherein the first data packet comprises N data packets; and
- after the receiving a first data packet, the method further comprises:
- in a case that data packet numbers of target data packets in the N data packets are determined as discontinuous, determining that the target video frame is a damaged frame, wherein
- the target data packets are trailing data packets of the target video frame, and N is a positive integer.

* * * * *